(12) United States Patent
Nolen et al.

(10) Patent No.: US 11,008,134 B2
(45) Date of Patent: May 18, 2021

(54) FOLDABLE AND/OR COLLAPSIBLE PLASTIC/COMPOSITE UTILITY ENCLOSURES

(71) Applicants: Dustin Kyle Nolen, Mount Olive, AL (US); Raymond George Thompson, Hoover, AL (US); Selvum Pillay, Hoover, AL (US)

(72) Inventors: Dustin Kyle Nolen, Mount Olive, AL (US); Raymond George Thompson, Hoover, AL (US); Selvum Pillay, Hoover, AL (US)

( * ) Notice: Subject to any disclaimer, the term of this patent is extended or adjusted under 35 U.S.C. 154(b) by 0 days.

(21) Appl. No.: 16/663,391

(22) Filed: Oct. 25, 2019

(65) Prior Publication Data

US 2021/0016921 A1 Jan. 21, 2021

Related U.S. Application Data

(60) Provisional application No. 62/751,278, filed on Oct. 26, 2018.

(51) Int. Cl.
| | | |
|---|---|---|
| *B65D 6/18* | (2006.01) | |
| *B65D 6/00* | (2006.01) | |
| *G01F 15/14* | (2006.01) | |
| *H02B 1/26* | (2006.01) | |

(52) U.S. Cl.
CPC .......... *B65D 11/1846* (2013.01); *B65D 11/10* (2013.01); *G01F 15/14* (2013.01); *H02B 1/26* (2013.01)

(58) Field of Classification Search
CPC . B65D 11/1846; B65D 11/18; B65D 11/1866; B65D 11/186; B65D 7/26; B65D 7/28; B65D 9/18; B65D 9/14; B65D 9/12; H02B 1/26; G01F 15/14
See application file for complete search history.

(56) References Cited

U.S. PATENT DOCUMENTS

| | | | |
|---|---|---|---|
| 3,164,281 A * | 1/1965 | Williams, Jr. ........... | B65D 7/26 217/14 |
| 4,820,383 A * | 4/1989 | Shchamorov ...... | B65D 11/1846 220/6 |
| 5,333,750 A | 8/1994 | McKinnon | |

* cited by examiner

*Primary Examiner* — Don M Anderson
(74) *Attorney, Agent, or Firm* — Lanier Ford Shaver & Payne, PC; Gerald M. Walsh (57) ABSTRACT

A foldable rectangular plastic/composite enclosure having first, second, third and fourth sides connected by hinges. The enclosure folds flat by rotating the sides on the hinges but is constructed to fold only in one direction. The hinges allow the enclosure to be folded flat for storage and transportation. The hinges are composed of a plurality of hinge members wherein each hinge member is positioned in a housing. The housing has an open interior which helps anchor the enclosure in the ground. An insertable locking pin can be inserted through each hinge to prevent the enclosure from folding. The enclosure can be made of plastic/composite imbedded with fibers such as carbon fibers, glass fibers, or ceramic fibers or imbedded with particles such as glass particles. The use of plastic/composite and various openings or cutouts makes the enclosure light weight.

17 Claims, 8 Drawing Sheets

FOLDABLE AND/OR COLLAPSIBLE PLASTIC/COMPOSITE UTILITY ENCLOSURES

CROSS-REFERENCE TO RELATED APPLICATION

This application claims priority to U.S. Provisional Patent Application No. 62/751,278, entitled "Foldable and/or Collapsible Plastic Meter Box and Utility Vault", filed on Oct. 26, 2018, the contents of that application being incorporated herein by reference in its entirety.

FIELD OF THE INVENTION

The invention relates to utility underground enclosures for providing protection for below ground devices such as water meters, valves, telecom hardware, and the like and, more particularly, to a foldable and/or collapsible plastic/composite utility enclosure.

BACKGROUND OF THE INVENTION

Utility enclosures are used to protect buried meters, valves, and telecom hardware and need to be capable of withstanding heavy loads that may be placed on the cover of the utility enclosure. Concrete utility enclosures are commonly used in or near roadways and driveways since they are heavy duty and are capable of withstanding heavy loads placed on the cover. Concrete utility enclosures are formed by a wall of concrete that extends around the utility. A lip extends about the top of the utility enclosure in the interior of the utility enclosure. The cover of the utility enclosure fits into the interior of the utility enclosure and rests on the lip. The concrete lip provides sufficient support to the cover to enable the utility enclosure to withstand the force of heavy loads.

Concrete utility enclosures present some disadvantages, however. Concrete utility enclosures are difficult to transport and install. They are bulky and take up space. During transport, concrete utility enclosures are prone to being chipped, and significant amounts of concrete utility enclosures become non-usable because of damage incurred in transport. Installation of concrete utility enclosures is difficult because of the weight of the utility enclosures. Installation of a concrete utility enclosure generally requires the effort of two people because the utility enclosures weigh in excess of two hundred pounds each. The weight of the concrete utility enclosures also presents some danger of physical injury to the persons installing the utility enclosure.

Plastic utility enclosures are known. U.S. Pat. No. 5,333,750 discloses a plastic utility enclosure that is durable, lightweight, and capable of being located in roadways or driveways and withstanding heavy loads. However, plastic utility enclosures also are bulky and take up space during transportation. What is needed is a foldable utility enclosure that takes up reduced space when folded.

SUMMARY OF THE INVENTION

This invention is a foldable plastic/composite enclosure having a first side, a second side opposite the first side, a third side, and a fourth side opposite the third side. Each of the sides has a first end and a second opposite end. The first end of the first side is connected to the first end of the third side by means of a first hinge. The second opposite end of the second side is connected to the second opposite end of the third side by means of a second hinge. The second opposite end of the first side is connected to the second opposite end of the fourth side by means of a third hinge. The first end of the second side is connected to the first end of the fourth side by means of a fourth hinge.

The third side is constructed to rotate on the first and second hinges only away from the first side. The fourth side is constructed to rotate on the third and fourth hinges only towards the first side. The third side and the fourth side are constructed to rotate until the first side engages the second side and the foldable plastic/composite enclosure is in a folded configuration. The folded plastic/composite enclosure when in a folded configuration has only 15 to 20 percent of the thickness compared to an unfolded configuration.

The first end of the first side and the first end of the second side are curved. The first end of the third side is positioned slideably over the first end of the first side and the first end of the fourth side is positioned slideably over the first end of the second side. The second opposite end of the first side abuts against the second opposite end of the fourth side and the second opposite end of the third side abuts against the second opposite end of the second side. The second opposite ends are angled.

Each hinge consists of hinge members wherein each hinge member is positioned in a housing. The housing has an open interior to help anchor the housing in the ground. Each edge of each side has a plurality of space-apart hinge members wherein hinge members on one side engage the hinge members on another side to form the hinge. One or more of the hinges may have a reversibly insertable locking pin that prevents the sides from rotating on the hinges and prevents the foldable plastic/composite enclosure from folding.

The foldable and/or collapsible plastic/composite enclosure of this invention can be made of any type of plastic or composite, preferably plastic imbedded with fibers such as carbon fibers, glass fibers, or ceramic fibers or imbedded with particles such as glass particles. The use of plastic/composite and various openings or cutouts makes the enclosure light weight. The hinges allow the enclosure to be folded flat for storage and transportation. The pairs of sides are symmetrical which facilitates manufacturing. The foldable plastic/composite enclosure is ideal for housing underground utilities. However, it can be used to house or contain any desired device.

DESCRIPTION OF THE INVENTION

Figure 1:
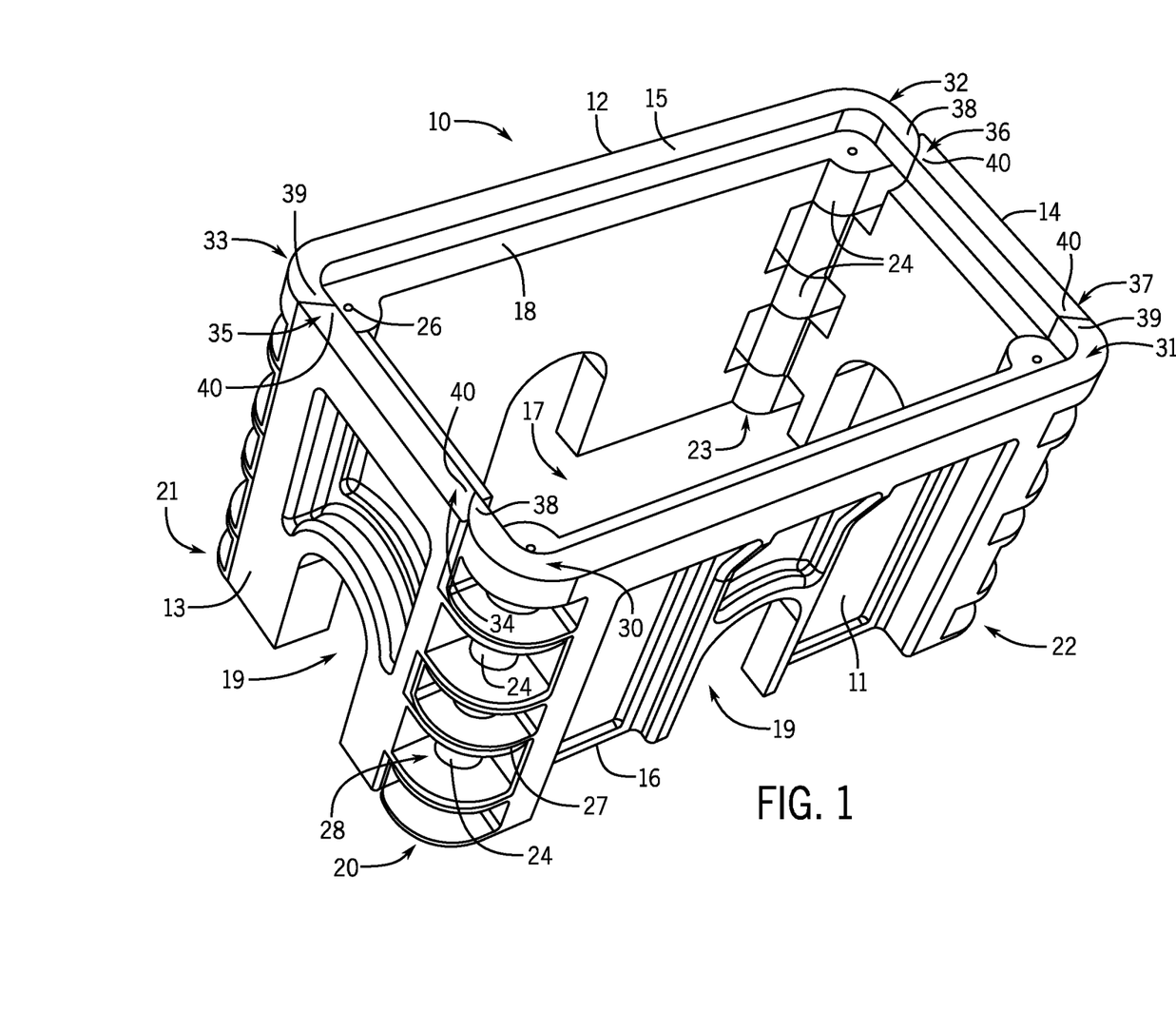
FIG. 1 is a top, front, perspective view of the utility enclosure of the present invention.

FIG. 1 is a top, front, perspective view of the utility enclosure 10 of the present invention. The enclosure 10 is rectangular and has a first side 11, a second side 12 opposite the first side 11, a third side 13, and a fourth side 14 opposite the third side 13. The first side 11 and the second side 12 form a first pair of sides and the third side 13 and the second side 14 form a second pair of sides. The enclosure 10 has a top end 15, a bottom end 16, and an interior 17. A ledge 18 is formed in the interior 17 near the top end 15 to support a cover (see FIGS. 11 and 12). The edges of each side 11, 12, 13, and 14 are joined together with hinges 20, 21, 22, and 23 to form the rectangular utility enclosure 10, with a hinge in each corner of the rectangle. The hinges 20, 21, 22, and 23 are made up of hinge members 24. Each hinge member 24 has a central hole 25 (see FIGS. 2A and 2B) for the insertion of a hinge pin 26 to form the hinge, as is known in the art. The hinge members 24 are formed in open hollow housings 27, the housings 27 having interiors 28.

First side 11 has a first end 30 and a second opposite end 31. The second opposite side 12 has a first end 32 and a second opposite end 33. The third side 13 has a first end 34 and a second opposite end 35. The fourth side 14 has a first end 36 and a second opposite end 37. The first ends 30 and 32 of the sides 11 and 12 (first pair of sides) form curved corners which end with curved extensions 38. The second opposite ends 31 and 33 of sides 11 and 12 are also curved and form acute angles 39. The first ends 34 and 36 of sides 13 and 14 (second pair of sides) and the second opposite ends 35 and 37 of sides 13 and 14 form obtuse angles 40. The first ends 34 and 36 of the sides 13 and 14 fit over the curved extensions 38 of sides 11 and 12 and the first ends 34 and 36 may be slightly curved to match the curved extensions 38. The angled edges of the second opposite ends 35 and 37 of sides 13 and 14 abut the angled edges of the ends 31 and 33 of the sides 11 and 12. The sides 11, 12, 13, and 14 may have openings 19 to accommodate wires, pipes, tubing, and the like.

Figure 2A:
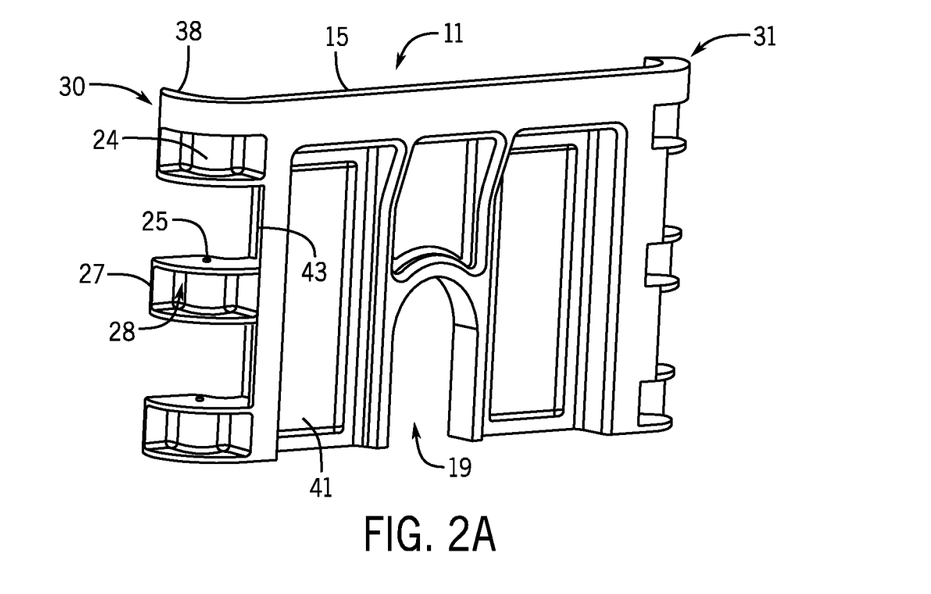
FIG. 2A is perspective view from an exterior surface of a first side the utility enclosure.
Figure 2B:
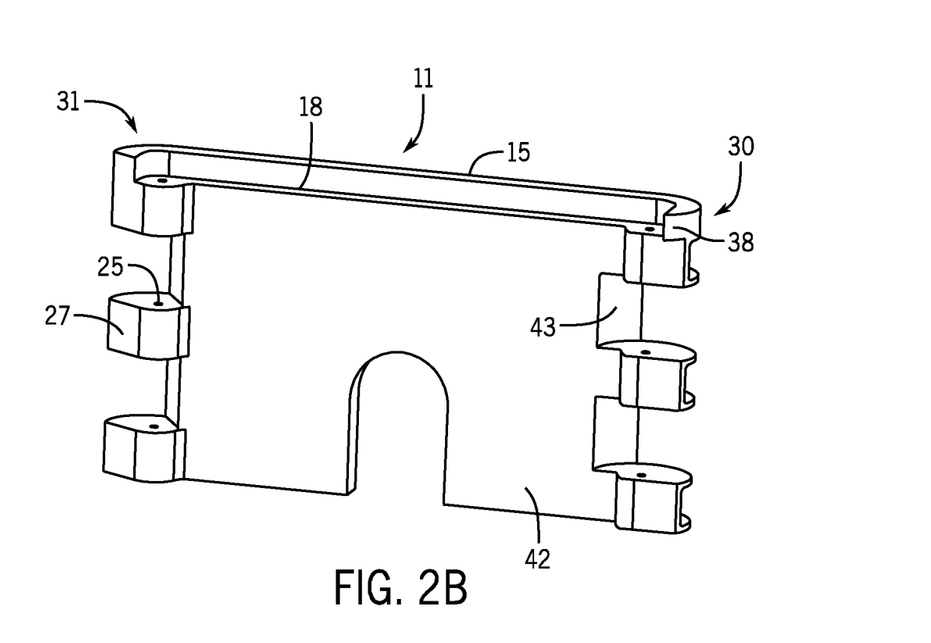
FIG. 2B is a perspective view from an interior surface of the first side.

FIG. 2A is perspective view from an exterior surface 41 of the first side 11, separated from the utility enclosure 10, and FIG. 2B is a perspective view from an interior surface 42 of the first side 11. The hinge members 24, the housings 27, and the interiors 28 can be seen in more detail. Grooves or spaces 43 between the hinge members 24 accommodate the housings 27 of the hinge members 24 that engage the first side 11 to complete the formation of the hinges 23.

Figure 3A:
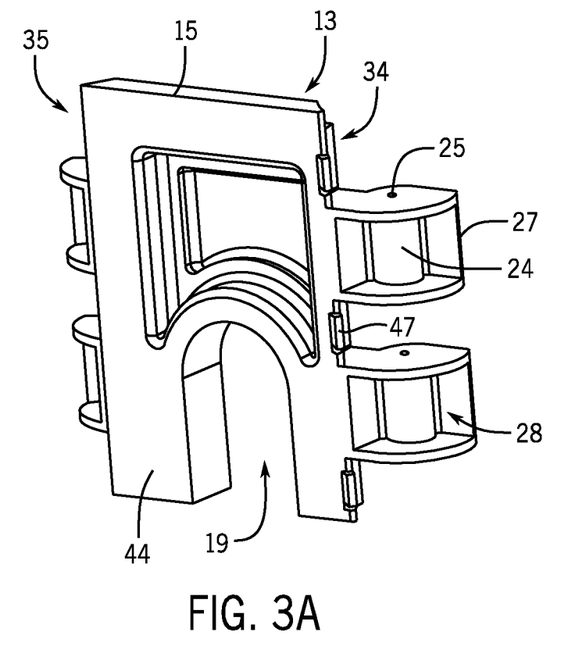
FIG. 3A is perspective view from an exterior surface of a third side.
Figure 3B:
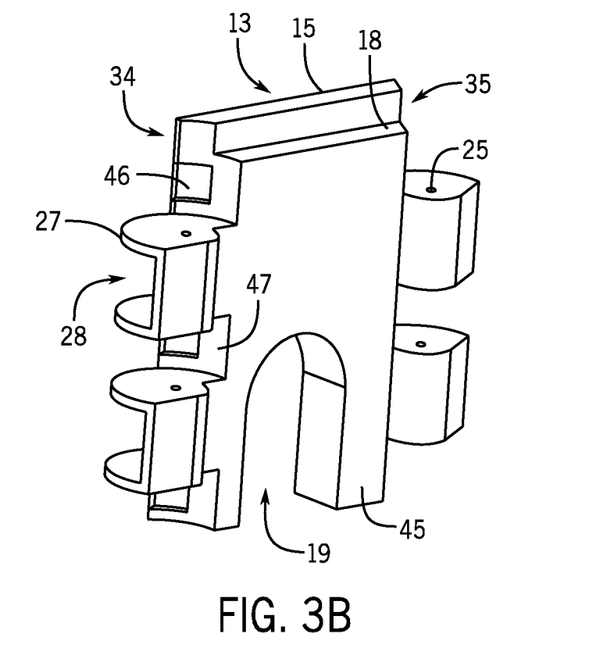
FIG. 3B is a perspective view from an interior surface of the third side.

FIG. 3A is perspective view from an exterior surface 44 of the third side 13 separated from the utility enclosure 10 and FIG. 3B is a perspective view from an interior surface 45. The hinge members 24, the housings 27, and the interiors 28 can be seen in more detail. FIGS. 3A and 3B further show latches 46 which lock the third side 13 to the first side 11 to prevent the utility enclosure 10 from folding. Grooves 47 between the hinge members 24 accommodate the housings 27 of the hinge members 24 that engage the third side 13 to complete the formation of the hinges 20, 21, 22, 23.

The housings 27 strengthen the hinges 20, 21, 22, 23 and protect them from external forces. When the utility enclosure 10 is placed in the ground to protect an underground device, soil, rocks, and cement can fill the interiors 28 of the housings 27 which will prevent the utility enclosure 10 from moving or folding. The first side 11 and the second side 12 are identical to each other and the third side 13 and the fourth side 14 are identical to each other with regard to hinging and folding features.

Figure 4:
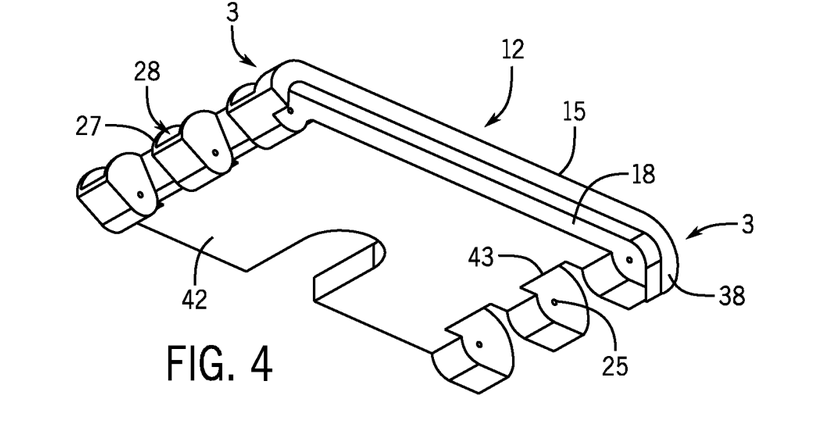
FIG. 4 is a top, interior surface view of the second side of the utility enclosure.
Figure 5:
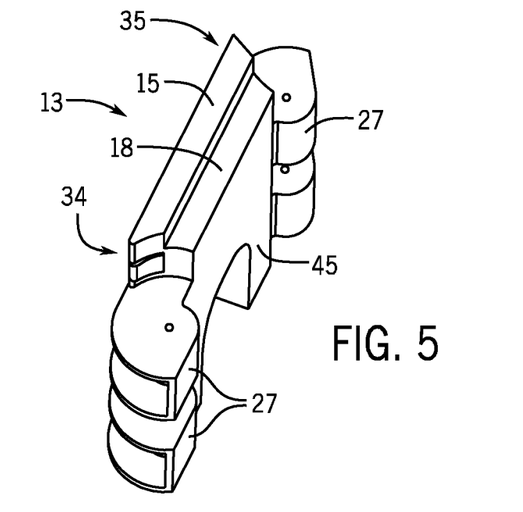
FIG. 5 is a top, interior surface view of the third side of the utility enclosure.
Figure 6:
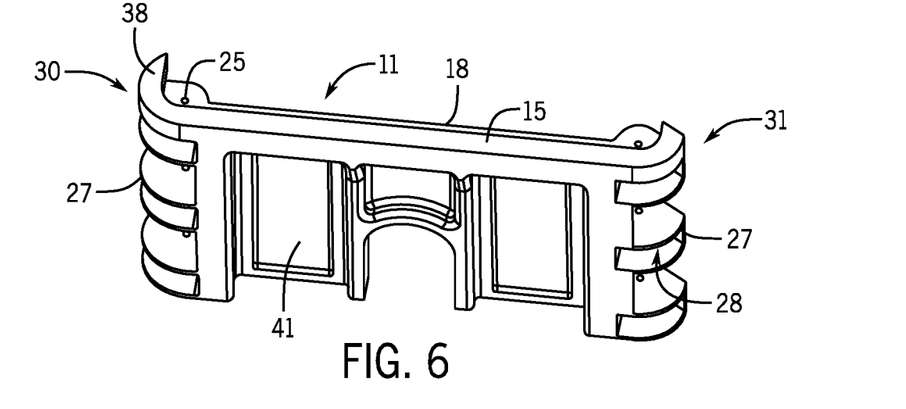
FIG. 6 is a top, exterior surface view of the first side of the utility enclosure.

FIG. 4 is a top, interior surface view of the second side 12. FIG. 5 is a top, interior surface view of the third side 13. FIG. 6 is a top, exterior surface view of the first side 11. The utility enclosure 10 is formed by inserting the housings 27 on end 35 of the third side 13 in between the housings 27 on end 31 of the second side 12 and inserting the housings 27 on end 34 of the third side 13 in between the housings 27 on end 30 of the first side 11. The pins 26 are then inserted through the holes 25 to form the hinges 20, 21, 22, 23. The fourth side 14 is added to sides 11 and 12 in the same way to complete the assembly of the utility enclosure 10.

Figure 7A:
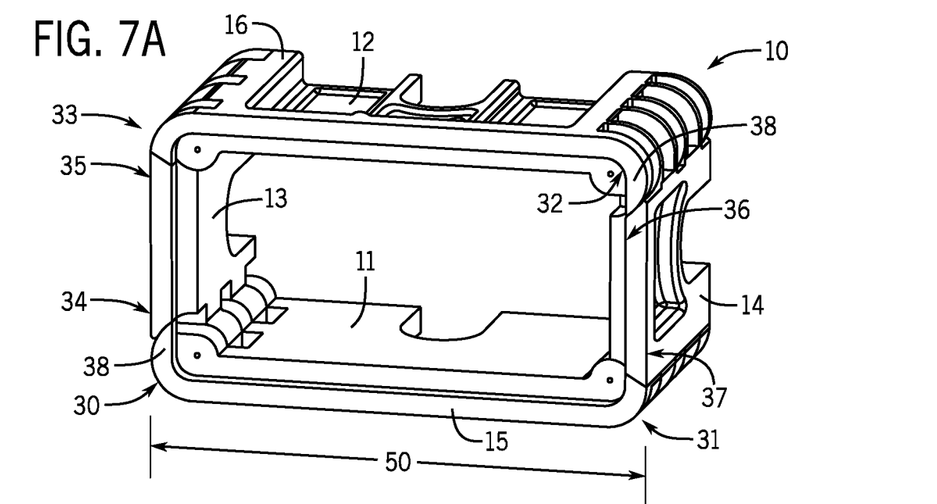
FIG. 7A is a top perspective view of the utility enclosure laying with its first side on a horizontal plane in an unfolded configuration.
Figure 7B:
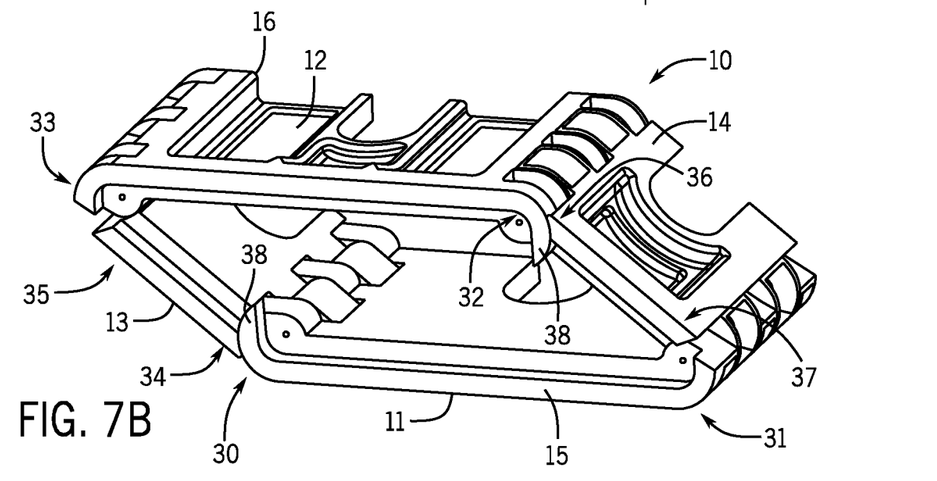
FIG. 7B shows the utility enclosure of FIG. 7A in a semi-folded configuration.
Figure 7C:
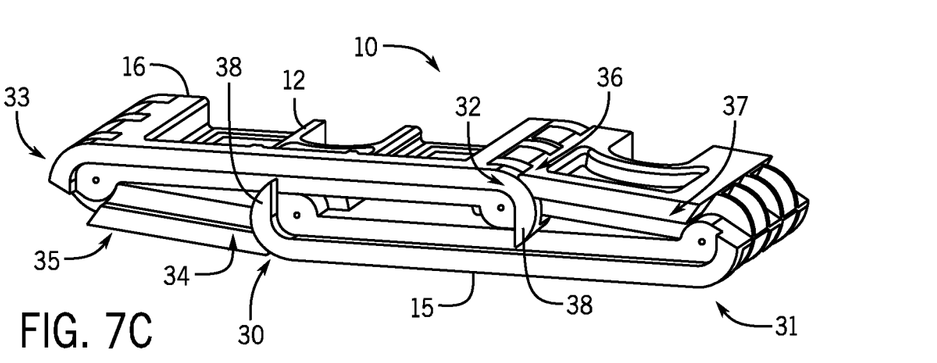
FIG. 7C shows the utility enclosure of FIG. 7A in a completely folded configuration.

FIG. 7A is a top perspective view of the utility enclosure 10 laying with its first side 11 on a horizontal plane, shown by double arrow 50. The utility enclosure 10 is in an unfolded configuration. FIG. 7B shows the utility enclosure 10 in a semi-folded configuration. FIG. 7C shows the utility enclosure 10 in a completely folded configuration. As the second side 13 is rotated away from the first side 11 the fourth side 14 is rotated towards the first side 11. The second side 12 moves inward towards the first side 11. In the folded configuration the utility enclosure 10 has about 15% to 25% of the thickness, compared to the unfolded configuration, preferably about 20%.

Figure 8A:
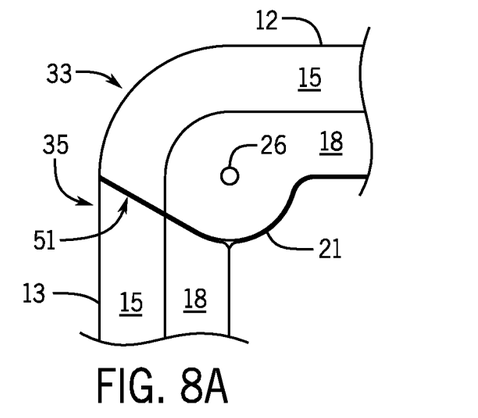
FIG. 8A shows an enlarged top view of an end of a second side and an end of the third side in an unfolded configuration.
Figure 8B:
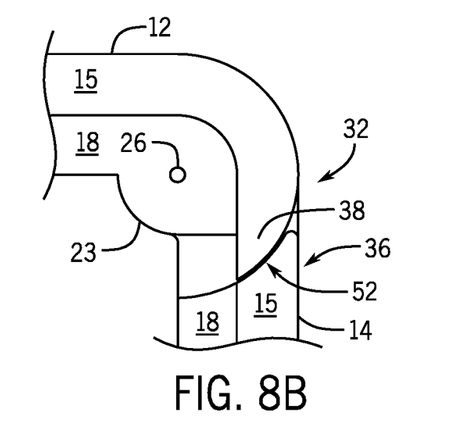
FIG. 8B show an enlarged top view of the end of the second side and an end of a fourth side in an unfolded configuration.

FIG. 8A shows an enlarged top view of the end 33 of the second side 12 and the end 35 of the third side 13 in an unfolded configuration. FIG. 8B shows an enlarged top view of the end 32 of the second side 12 and the end 36 of the fourth side 14 in an unfolded position. The utility enclosure 10 cannot fold in a direction opposite to that shown in FIGS. 9A, 9B, 10A, and 10C because the end 35 of side 13 abuts the end 33 of side 12, shown by arrow 51, at an angle relative to sides 12 and 13. The end 35 of side 13 cannot move around the end 33 of side 12. However, the end 36 of side 14 can move around end 32 of side 12, as shown in FIGS. 9A, 9B, 10A, and 10C, because end 36 overlaps end 32, shown by arrow 52.

Figure 9A:
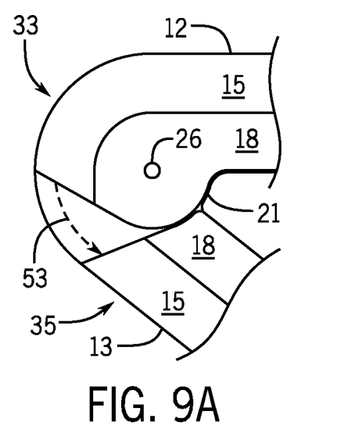
FIGS. 9A and 9B show the same views as 8A and 8B but with the utility enclosure in a semi-folded configuration.
Figure 9B:
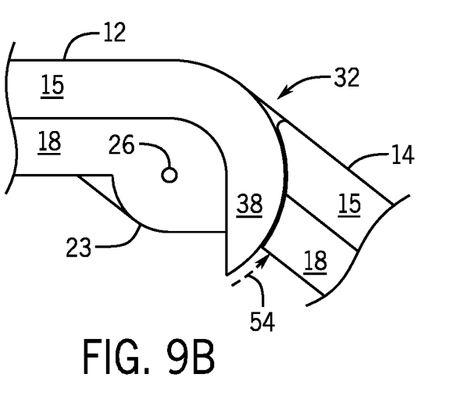
Figure 10A:
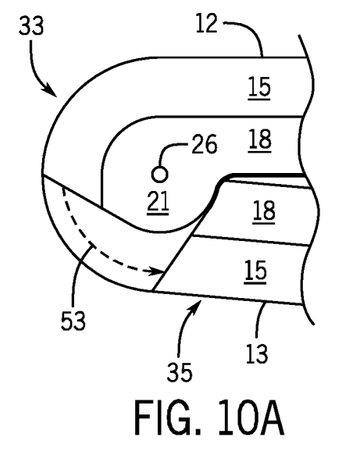
FIGS. 10A and 10B show the same views 8A and 8B but with the utility enclosure in a completely folded configuration.
Figure 10B:
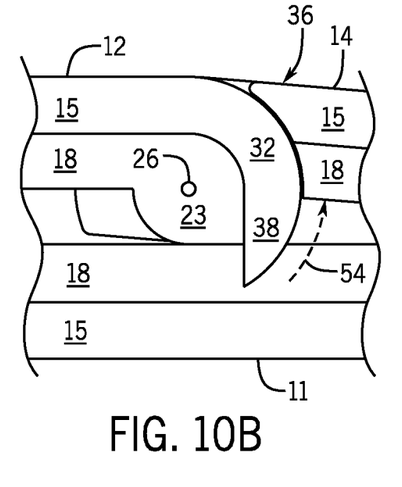

FIGS. 9A and 9B show the same views as FIGS. 8A and 8B but with the utility enclosure 10 in a semi-folded configuration. Arrow 53 in FIG. 9A shows the extent to which end 35 of side 13 has moved away from end 33 of side 12. Arrow 54 in FIG. 9B shows the extent to which end 36 of side 14 has moved over and around the curved extension 38 of end 32 of side 12. FIGS. 10A and 10B show the same views as FIGS. 8A and 8B but with the utility enclosure 10 in a completely folded configuration with the first side 11 engaging the second side 12. The folding of the utility enclosure 10 is reversible and the utility enclosure 10 can be restored to its unfolded configuration by pulling the first side 11 and the second side 12 apart.

Figure 11:
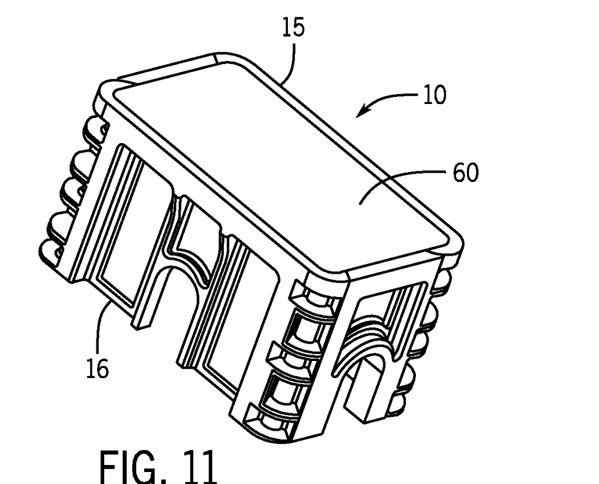
FIG. 11 shows a top perspective view of the utility enclosure with a top cover inserted in a top end of the utility enclosure.
Figure 12:
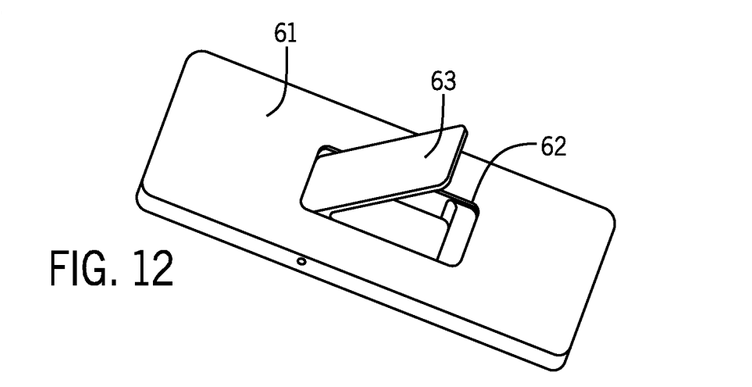
FIG. 12 shows a top perspective view of the top cover having an opening with a door.

FIG. 11 shows a top perspective view of the utility enclosure 10 with a top cover 60 inserted in the top end 15. The top cover 60 can have handles or openings for removing the cover 60. FIG. 12 shows a top perspective view of a top cover 61 having an opening 62 with a door 63. The interior 17 of the utility enclosure 10 can be viewed and accessed by raising the door 63.

Figure 13:
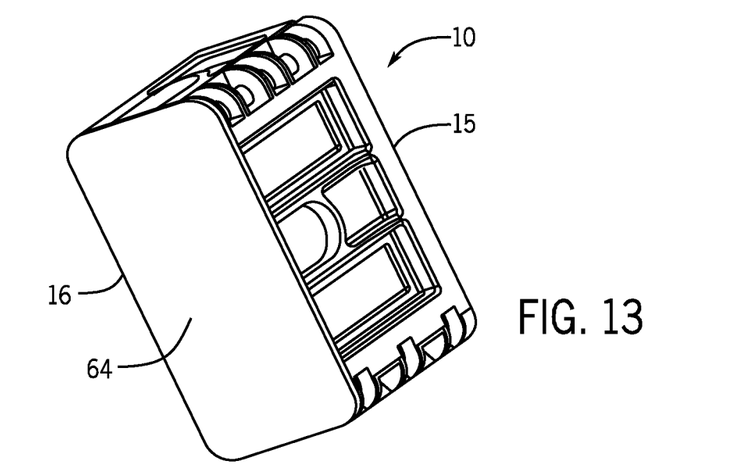
FIG. 13 shows a bottom perspective view of the utility enclosure with a bottom cover attached reversibly to the bottom end of the utility enclosure.

FIG. 13 shows a bottom perspective view of the utility enclosure 10 with a bottom cover 64 attached reversibly to the bottom end 16 by methods well known in the art. The use of a bottom cover 64 allows the utility enclosure 10 to be used as any type of enclosure for any type of articles.

Figure 14:
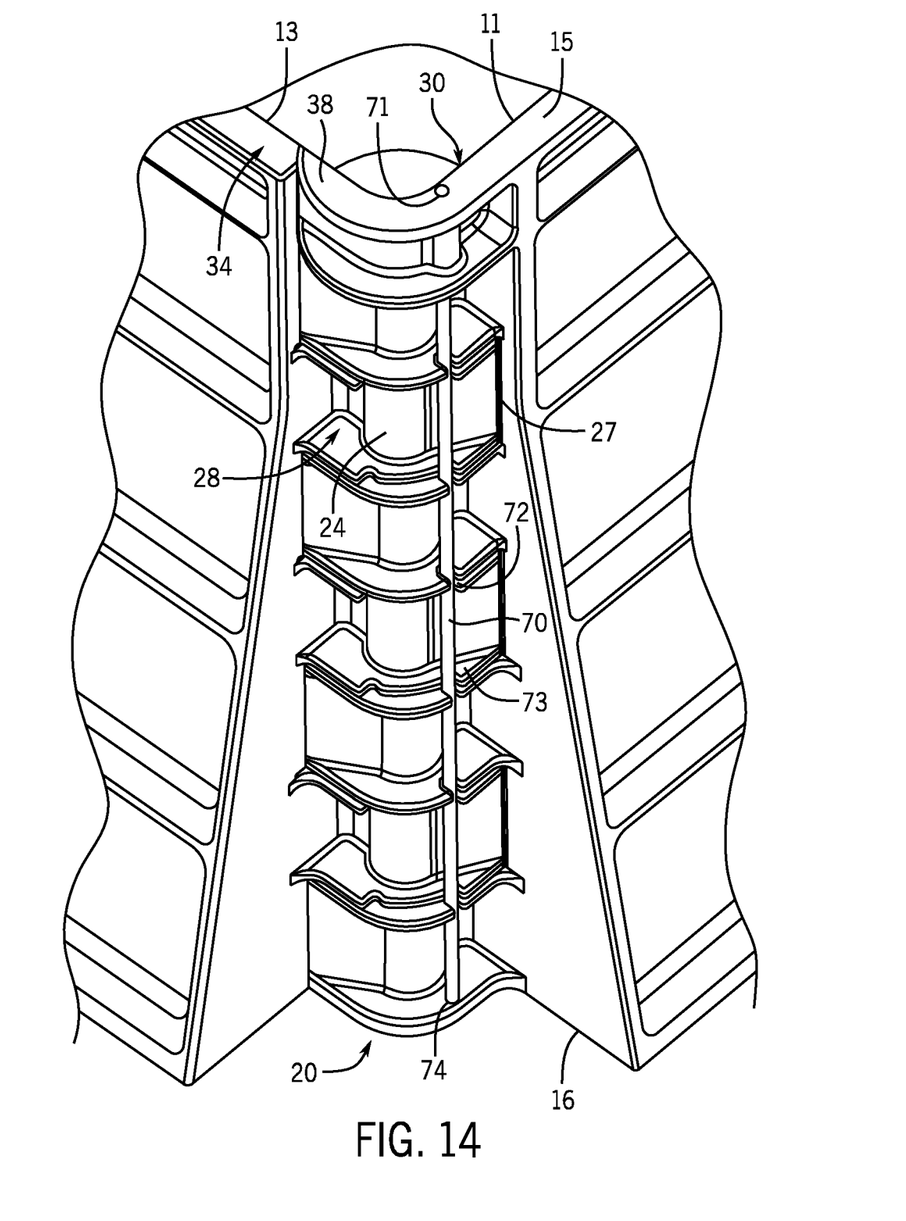
FIG. 14 shows a perspective view of corner with a hinge connecting two sides, with a locking pin inserted through the hinge members to prevent rotation of the sides on the hinge and to prevent folding of the foldable plastic enclosure.

FIG. 14 shows a perspective view of corner with a hinge connecting two sides, with a locking pin 70 inserted through the hinge members 24 to prevent rotation of the sides on the hinge and to prevent folding of the foldable plastic/composite enclosure. An insertion hole 71 is on the top 15 to insert the locking pin 70. Each hinge member 24 has an upper groove 72 and a bottom groove 73 through which the locking pin 70 passes. The locking pin 70 can be retained in a opening 74 in the bottom hinge member.

The foregoing description illustrates and describes the disclosure. Additionally, the disclosure shows and describes only the preferred embodiments but, it is to be understood that the preferred embodiments are capable of being formed in various other combinations, modifications, and environments and are capable of changes or modifications within the scope of the invention concepts as expressed herein, commensurate with the above teachings and/or the skill or knowledge of the relevant art. The embodiments described herein above are further intended to explain the best modes known by applicant and to enable others skilled in the art to utilize the disclosure in such, or other, embodiments and with the various modifications required by the particular applications or uses thereof. Accordingly, the description is not intended to limit the invention to the form disclosed herein. Also, it is intended that the appended claims be construed to include alternative embodiments. It will be further understood that various changes in the details, materials, and arrangements of the parts which have been described and illustrated above in order to explain the nature of this invention may be made by those skilled in the art without departing from the principle and scope of the invention as recited in the following claims.

The invention claimed is:

1. A foldable plastic and/or composite enclosure comprising:
   a) a first side, a second side opposite the first side, a third side, and a fourth side opposite the third side, each of said sides having a first end and a second opposite end;
   b) the first end of the first side connected to the first end of the third side by means of a first hinge; the second opposite end of the second side connected to the second opposite end of the third side by means of a second hinge; the second opposite end of the first side connected to the second opposite end of the fourth side by means of a third hinge; and the first end of the second side connected to the first end of the fourth side by means of a fourth hinge, wherein each hinge has a single hinge pin that extends from a top of the foldable plastic and/or composite enclosure to a bottom of the foldable plastic and/or composite enclosure;
   c) the third side is constructed to rotate on the first and second hinges only away from the first side and the fourth side is constructed to rotate on the third and fourth hinges only towards the first side when the foldable plastic and/or composite enclosure is moved from an unfolded position to a folded position;
   d) the third side and the fourth side are constructed to rotate until the first side engages the second side and the foldable plastic and/or composite enclosure is in a folded configuration; and
   e) the first end of the third side at the top of the foldable plastic and/or composite enclosure slidably overlaps the first end of the first side at the top of the foldable plastic and/or composite enclosure and the first end of the fourth side at the top of the foldable plastic and/or composite enclosure slidably overlaps the first end of the second side at the top of the foldable plastic and/or composite enclosure.

2. The foldable plastic and/or composite enclosure of claim 1, wherein the foldable plastic and/or composite enclosure in a folded configuration has only 15 to 20 percent of thickness compared to the foldable plastic and/or composite enclosure in an unfolded configuration.

3. The foldable plastic and/or composite enclosure of claim 1, further comprising the second opposite end of the first side abutting the second opposite end of the fourth side and the second opposite end of the third side abutting the second opposite end of the second side.

4. The foldable plastic and/or composite enclosure of claim 3, wherein the second opposite end of the third side forms an obtuse angle between an interior surface of the third side and an interior surface of the first side and the obtuse angle extends from the top of the foldable plastic and/or composite enclosure to the bottom of the foldable plastic and/or composite enclosure and wherein the second opposite end of the fourth side forms an acute angle between an interior surface of the fourth side and an interior surface of the first side and the acute angle extends from the top of the foldable plastic and/or composite enclosure to the bottom of the foldable plastic and/or composite enclosure.

5. The foldable plastic and/or composite enclosure of claim 1, further comprising each hinge being formed of hinge members wherein each hinge member is positioned in a housing.

6. The foldable plastic and/or composite enclosure of claim 5 wherein the housing has an open interior.

7. The foldable plastic and/or composite enclosure of claim 5 wherein each end of each side has a plurality of spaced-apart hinge members.

8. The foldable plastic and/or composite enclosure of claim 1, further comprising the first hinge, second hinge, third hinge, or fourth hinge having a reversibly insertable locking pin extending from the top of the foldable plastic and/or composite enclosure to the bottom of the foldable plastic and/or composite enclosure that prevents the sides from rotating on the first hinge, second hinge, third hinge, or fourth hinge and prevents the foldable plastic and/or composite enclosure from folding.

9. A foldable plastic and/or composite enclosure, comprising:
   a) a first side, a second side opposite the first side, a third side, and a fourth side opposite the third side, each of said sides having a first end and a second opposite end;

b) the first end of the first side connected to the first end of the third side by means of a first hinge; the second opposite end of the second side connected to the second opposite end of the third side by means of a second hinge; the second opposite end of the first side connected to the second opposite end of the fourth side by means of a third hinge; and the first end of the second side connected to the first end of the fourth side by means of a fourth hinge, wherein each hinge has a single hinge pin that extends from a top of the foldable plastic and/or composite enclosure to a bottom of the foldable plastic and/or composite enclosure;

c) the third side is constructed to rotate on the first and second hinges only away from the first side and the fourth side is constructed to rotate on the third and fourth hinges only towards the first side when the foldable plastic and/or composite enclosure is moved from an unfolded position to a folded position;

d) the third side and the fourth side are constructed to rotate until the first side engages the second side and the foldable plastic and/or composite enclosure is in a folded configuration;

e) the first end of the third side at the top of the foldable plastic and/or composite enclosure slidably overlaps the first end of the first side at the top of the foldable plastic and/or composite enclosure and the first end of the fourth side at the top of the foldable plastic and/or composite enclosure slidably overlaps the first end of the second side at the top of the foldable plastic and/or composite enclosure; and f) the second opposite end of the first side abutting the second opposite end of the fourth side and the second opposite end of the third side abutting the second opposite end of the second side, wherein the foldable plastic and/or composite enclosure in a folded configuration has only 15 to 20 percent of thickness compared to the foldable plastic and/or composite enclosure in an unfolded configuration.

10. The foldable plastic and/or composite enclosure of claim 9, wherein the second opposite end of the third side forms an obtuse angle between an interior surface of the third side and an interior surface of the first side and the obtuse angle extends from the top of the foldable plastic and/or composite enclosure to the bottom of the foldable plastic and/or composite enclosure and wherein the second opposite end of the fourth side forms an acute angle between an interior surface of the fourth side and an interior surface of the first side and the acute angle extends from the top of the foldable plastic and/or composite enclosure to the bottom of the foldable plastic and/or composite enclosure.

11. The foldable plastic and/or composite enclosure of claim 9, further comprising each hinge being formed of hinge members wherein each hinge member is positioned in a housing.

12. The foldable plastic and/or composite enclosure of claim 11 wherein the housing has an open interior.

13. The foldable plastic and/or composite enclosure of claim 11 wherein each end of each side has a plurality of spaced-apart hinge members.

14. The foldable plastic and/or composite enclosure of claim 9, further comprising the first hinge, second hinge, third hinge, or fourth hinge having a reversibly insertable locking pin extending from the top of the foldable plastic and/or composite enclosure to the bottom of the foldable plastic and/or composite enclosure that prevents the sides from rotating on the first hinge, second hinge, third hinge, or fourth hinge and prevents the foldable plastic and/or composite enclosure from folding.

15. A foldable plastic and/or composite enclosure, comprising:

a) a first side, a second side opposite the first side, a third side, and a fourth side opposite the third side, each of said sides having a first end and a second opposite end;

b) the first end of the first side connected to the first end of the third side by means of a first hinge; the second opposite end of the second side connected to the second opposite end of the third side by means of a second hinge; the second opposite end of the first side connected to the second opposite end of the fourth side by means of a third hinge; and the first end of the second side connected to the first end of the fourth side by means of a fourth hinge, wherein each hinge has a single hinge pin that extends from a top of the foldable plastic and/or composite enclosure to a bottom of the foldable plastic and/or composite enclosure, each hinge being formed of hinge members, wherein each hinge member is positioned in a housing, and wherein the housing has an open interior;

c) the third side is constructed to rotate on the first and second hinges only away from the first side and the fourth side is constructed to rotate on the third and fourth hinges only towards the first side when the foldable plastic and/or composite enclosure is moved from an unfolded position to a folded position;

d) the third side and the fourth side are constructed to rotate until the first side engages the second side and the foldable plastic and/or composite enclosure is in a folded configuration;

e) the first end of the third side at the top of the foldable plastic and/or composite enclosure slidably overlaps the first end of the first side at the top of the foldable plastic and/or composite enclosure and the first end of the fourth side at the top of the foldable plastic and/or composite enclosure slidably overlaps the first end of the second side at the top of the foldable plastic and/or composite enclosure; and f) the second opposite end of the first side abutting the second opposite end of the fourth side and the second opposite end of the third side abutting the second opposite end of the second side, wherein the second opposite end of the third side forms an obtuse angle between an interior surface of the third side and an interior surface of the first side and the obtuse angle extends from the top of the foldable plastic and/or composite enclosure to the bottom of the foldable plastic and/or composite enclosure and wherein the second opposite end of the fourth side forms an acute angle between an interior surface of the fourth side and an interior surface of the first side and the acute angle extends from the top of the foldable plastic and/or composite enclosure to the bottom of the foldable plastic and/or composite enclosure, and wherein the foldable plastic and/or composite enclosure in a folded configuration has only 15 to 20 percent of thickness compared to the foldable plastic and/or composite enclosure in an unfolded configuration.

16. The foldable plastic and/or composite enclosure of claim 15 wherein each end of each side has a plurality of spaced-apart hinge members.

17. The foldable/plastic and/or composite enclosure of claim 16, further comprising the first hinge, second hinge, third hinge, or fourth hinge having a reversibly insertable locking pin extending from the top of the foldable plastic and/or composite enclosure to the bottom of the foldable plastic and/or composite enclosure passing through hinge members that prevents the sides from rotating on the first hinge, second hinge, third hinge, or fourth hinge and prevents the foldable plastic and/or composite enclosure from folding.

\* \* \* \* \*